United States Patent [19]

Nace

[11] Patent Number: 5,525,702
[45] Date of Patent: Jun. 11, 1996

[54] BIODEGRADABLE ALKYLENE OXIDE-LACTONE COPOLYMERS

[75] Inventor: Vaughn M. Nace, Lake Jackson, Tex.

[73] Assignee: The Dow Chemical Company, Midland, Mich.

[21] Appl. No.: 444,117

[22] Filed: May 18, 1995

[51] Int. Cl.$^6$ .................... C08G 63/08; C08G 63/82
[52] U.S. Cl. .................... 528/354; 528/357; 528/358; 528/361
[58] Field of Search .................... 528/354, 361, 528/358, 357

[56] References Cited

U.S. PATENT DOCUMENTS

| | | | |
|---|---|---|---|
| 2,962,524 | 11/1960 | Hostettler et al. | 560/185 |
| 3,169,945 | 2/1965 | Hostettler et al. | 528/355 |
| 3,219,725 | 11/1965 | Kirkland et al. | 525/472 |
| 3,312,753 | 4/1967 | Bailey, Jr. et al. | 528/357 |
| 3,578,642 | 5/1971 | Mueller, Jr. et al. | 528/358 |
| 3,585,257 | 6/1971 | Mueller, Jr. et al. | 525/114 |
| 3,629,374 | 12/1971 | Lundberg et al. | 525/187 |
| 3,646,170 | 2/1972 | Lundberg et al. | 525/187 |
| 3,660,433 | 5/1972 | Mallan et al. | 549/272 |
| 3,689,635 | 9/1972 | Critchfield et al. | 560/185 |
| 3,725,352 | 4/1973 | Koleske et al. | 528/301 |
| 3,795,701 | 3/1974 | Jenkins et al. | 560/185 |
| 3,867,353 | 2/1975 | Hsieh et al. | 528/358 |
| 3,880,955 | 4/1975 | Hsieh et al. | 525/271 |
| 3,921,333 | 11/1975 | Clendinning et al. | 528/354 |
| 4,291,155 | 9/1981 | Brochet | 528/358 |
| 4,698,259 | 10/1987 | Hervey | 428/378 |
| 5,032,671 | 7/1991 | Harper | 528/357 |

OTHER PUBLICATIONS

Benedict et al. *Polycaprolatione Degradation by Mixed and Pure Cultures of Bacteria and a Yeast*, 28 J. App. Pol. Sci., 335–342 (1983).

Rafler et al. *Biodegradable Polymers. 6th Comm. Polymerization of ϵ–Caprolactone*. Acta Pol., 91–5 (1992).

Natta et al., *Studies of Polymerization and Ring Formation. XXIII. ϵ–Caprolactone and its Polymers*, 56 J. Am. Chem. Soc. 455 (1934).

Dubois et al., *Macromolecular Engineering of Polylactones and Polylactides. 8. Ring–Opening Polymerization of ϵ–Caprolactone Initiated by Primary Amines and Trialkylaluminum*, Macromolecules 1992, 25, 2614–2618.

Martini et al. *Micellisation and Gelation of Triblock Copolymer of Ethylene Oxide & ϵ–Caprolactone, $Cl_nE_mCL_n$,* in Aqueous Solution, 90 (13) J. Chem. Soc. Faraday Trans., 1961–6 (1994).

Cerrai et al. *Polyether–Polyester Block Copolymers by Non--Catalysed Polymerization of ϵ–Caprolactone with Poly-(Ethylene Glycol)*, 30 Polymer 338–43 (1989).

Dubois et al. *Macromolecular Engineering of Polylactones and Polylactides I. End–Functionalization of Poly ϵ–Caprolactone*, 22 Pol. Bull. 475–82 (1989).

Barakat et al. *Living Polymerization & Selective End Functionalization of ϵ–Caprolaxtone Using Zinc Alkoxides as Initiators*, 24 Macromolecules 6542–5 (1991).

Dubois et al. *Macromolecular Engineering Polylactones and Polylactides. 11. Synthesis & Use of Alkylaluminum Dialkoxides & Dithiolates as Promoters of Hydroxy Telechelic Poly (ϵ–Caprolactone) & α,ω–Dihydroxy Triblock Copolymers Containing Outer Polyester Blocks* 26 Macromolecules 2730–5 (1993).

Dubois et al. *Macromolecular Engineering of Polylactones and Polylactides. 12. Study of the Depolymerization Reactions of Poly(ϵ–Caprolactone) with Functional Aluminum Alkoxide End Groups*, 26 Macromolecules 4407–12 (1993).

(List continued on next page.)

Primary Examiner—Shelley A. Dodson

[57] ABSTRACT

The biodegradability of polyglycol-based block copolymers is improved by including in the copolymer a lactone. Representative of these biodegradable enhanced copolymers are those made of 1,2-butylene oxide and ϵ-caprolactone capped with a homopolymer block of ethylene oxide. The copolymers of this invention have many uses, such as nonionic surfactants, foam control agents, lubricants, and the like.

20 Claims, 5 Drawing Sheets

Structures of Copolymers and Copolyesters

Triblock Diol

Diblock Monol

| Copolymer Sample | X | Y | Z | Type |
|---|---|---|---|---|
| Ex. 1 | 0.55 | 3.7 | 13 | Diol |
| Ex. C-1 | 0 | 5 | 13 | Diol |
| Ex. 2 | 2.5 | 4 | 17 | Monol |
| Ex. C-2 | 0 | 8.6 | 17 | Monol |

OTHER PUBLICATIONS

Dubois, et al., *Aluminium Alkoxides: A Family of Versatile Initiators for the Ring–Opening Polymerization of Lactones and Lactides*, Makromol. Chem., Macromol. Symp. 42/43, 103–116 (1991).

English Abstact Only Provided: Wang et al. *Synthesis & Characterization of Biodegradable Polycaprolactone–Block–Polyethylene Glycol Copolymer*, Inst. Chem., Acad. Sin., Beijing, Peop. Rep. China 100080) Gaofenzi Xuebao [GAXUE9] 1993, (5), 620–3 (Ch).

Abstract Only Provided: Martini et al. *The Bioadhesive Properties of a Triblock Copolymer of $\epsilon$–Caprolactone & Ethylene Oxide*, 113 (2) Inst. J. Pharm. 223–9 (1995).

Abstract Only Provided: *Biodegradable optically–active polymer prepn.—by ring opening polymerisation of epsilon––caprolactone and e.g. D–(–)–7–methyl–1,4–dioxepane––5–one*, Derwent WPI Acc No: 93–140395/17.

Abstract Only Provided: *Copolymers of lactic acid, 4–valerolactone and opt. higher lactone(s)! — are prepd. by conventional catalysed melt polycondensation yielding useful mol. wt. and are biodegradable*, Derwent WPI Acc No: 92–267986/32.

Okuda & Rushkin, *Mono(cyclopentadienyl) titanium Complexes as Initators for the Living Ring–Opening Polymerization of $\epsilon$–Caprolactone*, Macromolecules, vol. 26, pp. 5530–5532 (1993).

Dahlmann & Rafler, *Biodegradable polymers. 7th comm. On the mechanism of ring–opening polymerization of cyclic esters of aliphatic hydroxycarbolic acids by means of different tin compounds*, Acta Polymer, vol. 44, 103–107 (1993).

Knani et al., *Enzymatic Polyesterification in Organic Media. Enzyme–Catalyzed Synthesis of linear Polyesters. I. Condensation Polymerization of Linear Hydroxyesters. II Ring–Opening Polymerization of $\epsilon$–Caprolactone*, J. Pol. Sci.: Part A: Pol. Chem. vol. 31, 1221–1232 (1993).

Hovestadt et al., *Tetraphenylporphyrin–aluminium compounds as initiators for the the ring–opening polymerization of 2,2–dimethyltrimethylene carbonate: synthesis of homopolymers and copolymers with $\epsilon$–caprolactone, ethylene oxide and propylene oxide*, Polymer, vol. 33, No. 9, 1941–1948 (1992).

Duda & Penczek, *Kinetics of $\epsilon$–Caprolactone Polymerization on Dialkylaluminum Alkoxides*, Makromol. Chem., Macromol. Symp., vol. 47, pp. 127–140 (1991).

Duda & Penczek, *Anionic and Pseudoanionic Polymerization of $\epsilon$–Caprolactone*, Makromol. Chem., Macromol. Symp., vol. 42/43, pp. 135–143 (1991).

Sosnowski et al., *Telechelic poly($\epsilon$–caprolactone) terminated at both ends with OH groups and its derivatization*, Makromol. Chem., vol. 192, pp. 1457–1465 (1991).

Duda et al., *Living Pseudoanionic Polymerization of $\epsilon$–Caprolactone. Poly($\epsilon$–caprolactone)Free of Cyclics and with Controlled End Groups*, Macromolecules, vol. 23, pp. 1640–1646 (1990).

Hofman et al., *Polymerization of $\epsilon$–caprolactone with kinetic suppression of macrocycles*, Makromol. Chem., Rapid Commun. vol. 8, pp. 387–391 (1987).

Benedict et al., *Fungal Degradation of Polycaprolactones*, J. App. Pol. Sci., vol. 28, pp. 327–334 (1983).

Hamitou, et al., *A New Catalyst for the Living Polymerization of Lactones to Polyesters*, Macromolecules (Comm. to Editor), vol. 6, No. 4 (Jul.–Aug. 1973).

Lundberg et al., *Lactone Polymers. III. Polymerization of $\epsilon$–Caprolactone*, J. Pol. Sci.: Part A, vol. 7, pp. 2915–2930 (1969).

Uyama & Kobayashi, *Enzymatic Ring–Opening Polymerization of Lactones Catalyzed by Lipase*, Chem. Letters (The Chemical Society of Japan), pp. 1149–1150, (1993).

Nojima et al., *Crystallization of Block Copolymers II. Morphological Study of Poly(ethylene glycol)–Poly($\epsilon$–caprolactone) Block Copolymers*, Pol. J., vol. 24, No. 11, pp. 1271–1280 (1992).

Endo et al., *"Immortal" Polymerization of $\epsilon$–caprolactone Initiated by Aluminum Porphyrin in the Presence of Alcohol*, Macromolecules, vol. 20, pp. 2982–2988 (1987).

Perret & Skoulios, *Synthèse et caractérisation de copolymères séquencés polyoxyéthylene/poly–$\epsilon$–caprolactone*, Die Makromolekulare Chemie, vol. 156, pp. 143–156 (1972).

Brink et al., *Synthesis & Characterization of Polypropylene Oxide/Polycaprolactone Block Copolymers*, Polym. Prepr. (Am. Chem. Soc., Div. Polym. Chem.) (1989), 30(1), p. 294.

Stickney et al., *Synthesis & Characterization of High Molecular Weight Poly(Propylene Oxide/$\epsilon$–Caprolaxtone) Block Copolymers*, Polym. Prepr. (Am. Chem. Soc., Div. Polym. Chem.) (1991), 32(1), pp. 146–147.

Hseih & Wang, *An Improved Process for $\epsilon$–Caprolactone––Containing Block Polymers*, Polym. Prepr. (Am. Chem. Soc., Div. Polym. Chem.) (1984), 25(1), p. 230.

Burkhardt & Gardella, *Hydrolysis of Poly($\epsilon$–caprolactone): A Surface Study by ESCA and SIMS*, Polym. Prepr. (Am. Chem. Soc., Div. Polym. Chem.) (1991), 32(1), pp. 116–117.

McCassie et al., *Curent Methods for Determining Biodegradation of Polymeric Materials*, Polym. Mat. Sci. and Eng., Proc. of the ACS Div. of Poly. Mat. Sci.and Eng., vol. 67 (1992), pp. 353–354.

Tokiwa et al., *Biodegradation of Synthetic Polymers Containing Ester Bonds*, Polym. Mat. Sci. and Eng., Proc. of the ACS Div. of Polym. Mat. Sci. and Eng., vol. 62, pp. 988–992.

Morton & Wu, *Organolithium Polymerization of $\epsilon$–Caprolactone*, Journal: ACS symposium series, 1985, pp. 231–232.

Abstract Only Provided: *Block copolymers formed by the reaction of a polyethylene glycol and $\epsilon$–caprolactone which are suitable as "polyols" in urethane polymer production*, Res. Discl., 1979, vol. 177, #17741.

Cao, et al., *Studies on the Ring Opening Polymerization of Caprolactone*, Polym. Ball., vol. 20, pp. 117–121 (1988).

Figure 1

Structures of Copolymers and Copolyesters

Triblock Diol

Diblock Monol

| Copolymer Sample | X | Y | Z | Type |
|---|---|---|---|---|
| Ex. 1 | 0.55 | 3.7 | 13 | Diol |
| Ex. C-1 | 0 | 5 | 13 | Diol |
| Ex. 2 | 2.5 | 4 | 17 | Monol |
| Ex. C-2 | 0 | 8.6 | 17 | Monol |

Figure 2

Biodegradation Testing of BO/EO and Copolyester

Industrial seed used

BIODEGRADABLE ALKYLENE OXIDE-LACTONE COPOLYMERS

BACKGROUND OF THE INVENTION

This invention relates to biodegradable alkylene oxide-lactone copolymers. In one aspect, the invention relates to random copolymers of one or more lactones and one or more alkylene oxides while in another aspect, the invention relates to such copolymers capped with an alkylene oxide block which comprises the same and/or one or more different alkylene oxides as that used to make the copolymer. In another aspect, the invention relates to uncapped random copolymers of one or more lactones and one or more alkylene oxides, the copolymer made with a polyfunctional initiator. In yet another aspect, the invention relates to processes of making the alkylene oxide-lactone copolymers and to using these copolymers as nonionic surfactants and foam control agents.

Polyoxyalkylene block copolymers and homopolymers, also known as polyalkylene oxide block copolymers and homopolymers, are widely used as nonionic surfactants, foam control agents, mineral wetting agents, surfactants for use in cleaning formulations, emulsifiers, de-emulsifiers, dispersants, synthetic lubricants, and any application where surfactancy, lubricity, or foam control is important. In particular, polyoxyalkylene copolymers made from propylene oxide (PO), the butylene oxides, particularly 1,2-butylene oxide (BO), and ethylene oxide (EO) represent a major class of such materials.

In general, the hydrophilic portion of nonionic surfactants and foam control agents is typically a polyoxyethylene (POE) moiety. The hydrophobic block can be derived from a larger set of possible materials, examples of which are alkylated phenols, fatty alcohols and acids, polyoxypropylene (POP), and polyoxybutylene (POB). Each hydrophobe imparts unique performance attributes to the nonionic surfactant or foam control agent of which it is a part.

Polyglycol-type block copolymers typically exhibit a high degree of resistance to biodegradation. In general, however, polyglycols do eventually biodegrade over time, but not during the time period specified in most standardized tests.

Copolymers of alkylene oxides and lactones are known, e.g. U.S. Pat. Nos. 2,962,524, 3,312,753, 3,689,531, and 4,291,155, all of which are incorporated herein in their entirety by reference, but these copolymers are not capped and many are made with monofunctional initiators.

SUMMARY OF THE INVENTION

Biodegradable alkylene oxide-lactone block copolymers are described, the block copolymers comprising a first block comprising polymerized units of one or more alkylene oxides and one or more lactones, and a second block comprising polymerized units of one or more alkylene oxides (which can be the same or different than that used to make the first block). The presence of a lactone in the first block introduces ester functionality into the copolymer, which in turn enhances the overall biodegradability of the copolymer. In addition, this ester functionality in combination with the polyalkylene oxide cap, i.e. the second block, imparts a design flexibility to these copolymers that allows each to be tailored to specific applications, e.g. allows facile changes to the copolymer structure that in turn impact the solubility, foam control, etc. properties of the copolymer, and thus the application in which the polymers can be used.

In another embodiment of this invention, the copolymers are uncapped, i.e. do not contain a second block of polymerized alkylene oxide units, and these copolymers comprise the polymerized units of one or more alkylene oxides, one or more lactones, and a polyfunctional initiator. Preferably, the copolymers of this embodiment are prepared using an alkali metal hydroxide as the catalyst. This class of copolymers also demonstrates a desirable design flexibility regarding such properties as solubility, biodegradability, and the like.

DESCRIPTION OF THE PREFERRED EMBODIMENTS

The basic copolymer or first block of the alkylene oxide-lactone copolymers of this invention and their method of preparation are fully described in U.S. Pat. Nos. 2,962,524, 3,312,753, 3,689,531 and 4,291,155. The recurrence of the alkylene oxide and lactone groups within the copolymer backbone is typically random, it but may contain some degree of block character.

The alkylene oxide components of the basic copolymer include those of formula I (I)

in which each R, independently, is hydrogen, a $C_1$–$C_6$ alkyl or haloalkyl radical, or in which the two R substituents together with both vicinal epoxy carbons form a saturated or monoethylenically unsaturated cycloaliphatic hydrocarbon ring, preferably of five or six carbon atoms. The preferred alkylene oxide monomers contain 2 to 12 carbon atoms, and representative alkylene oxide monomers include ethylene oxide, propylene oxide, the butylene oxides, 1,2-epoxydodecane, cyclopentene oxide, cyclohexene oxide, styrene oxide, epichlorohydrin and the like. The butylene oxides, particularly 1,2-butylene oxide, and propylene oxide are the more preferred alkylene oxide monomers. While the alkylene oxide component may comprise two or more different alkylene oxides, e.g. a mixture of ethylene and propylene oxides, typically and preferably it consists of a single alkylene oxide.

The lactone used in this invention may be any lactone or combination of lactones having at least four carbon atoms in the ring, and these lactones include those of formula II in which when n is at least one and each R' is independently hydrogen; with the provisos that when n is 2, at least four R' are hydrogen, and when n is more than two, and the remaining R' are hydrogen, alkyl, cycloalkyl, alkoxy or single ring aromatic hydrocarbon radicals.

The lactones preferred as starting materials for the copolymer or first block of this invention include unsubstitued ε-caprolactones, ε-caprolactones substituted on the carbon atoms in the ring by one, two or three lower (one to four carbon atoms) alkyl radicals, and unsubstituted δ-valerolactones and γ-butyrolactones. The preparation of unsubstituted lactones is well known. The substituted ε-caprolactones, and mixtures of such lactones, can readily be prepared by reacting a corresponding substituted cyclohexanone with an oxidizing agent such as peracetic acid. The cyclohexanones may be obtained from substituted phenols or by other convenient synthetic routes. Other lactones that are suitable as starting materials include alkoxy ε-caprolactones such as methoxy and ethoxy ε-caprolactone, cycloalkyl, aryl and aralkyl ε-caprolactones such as cyclohexyl, phenyl and benzyl ε-caprolactone, and lactones such as ζ-enantholactone and η-caprylactone which have more than six carbon atoms in the ring.

The ε-caprolactones are the preferred lactones used to make the copolymer or first block of this invention, and these include those of formula III in which each R" independently, is hydrogen or a $C_1$–$C_4$ alkyl or alkoxy radical, with the proviso that no more than three R" substituents are groups other than hydrogen. Preferably, all R" substituents are hydrogen. Unsubstituted ε-caprolactone is the preferred ε-caprolactone.

The copolymer is prepared by polymerizing the alkylene oxide and lactone monomers with one another and a catalyzed initiator. In this process, the growth of the polymeric molecule is attributable to the attachment of linear (ring-opened) lactone units and alkylene oxide units at the functional sites of the initiator. The initiator may be mono- or poly- (e.g. di-, tri-, tetra-, etc.) functional, the functional site(s) typically a reactive hydrogen. Illustrative initiators include alcohols, amines, mercaptans, phenols, amino alcohols and mercapto alcohols. The hydroxyl and amino terminated initiators are preferred.

The monohydroxyl initiators used in this invention are illustrated by formula IV $$R'''(OR^{iv})_aOH \qquad (IV)$$

in which R''' is hydrocarbyl such as alkyl, cycloalkyl, aryl, aralkyl, alkaryl, etc., preferably containing up to 18 carbon atoms; $R^{iv}$ is an alkylene radical preferably containing from two to four carbon atoms; and a is an integer having a value of 0 to 18, preferably a value of 0 to 2. Illustrative monohydroxyl initiators include the alkanols, e.g. methanol, ethanol, isopropanol, n-butanol, 2-ethylhexanol, dodecanol, and the like; the monoalkyl ethers of glycols and polyglycols, e.g., 2-ethoxyethanol, 2-propoxyethanol, 2-butoxyethanol, the monoethyl ethers of diethylene glycol, of triethylene glycol, of tripropylene glycol; the monopropyl ethers of polyethylene glycol, of polypropylene glycol, of polybutylene glycol; and the alkylene oxide adducts of substituted and unsubstituted phenols, e.g. the ethylene oxide and/or propylene oxide adducts of alkylphenols such as nonylphenol.

The polyfunctional compounds are those having at least two reactive hydrogens that are capable of opening a lactone ring or a vicinal epoxide ring. These compounds include those of formula (V)

$$R^v(YH)_z \qquad (V)$$

in which $R^v$ is an aliphatic, cycloaliphatic, aromatic or heterocyclic radical; z is at least two; and the Y's are —O—, —S—, —NH— or —$NR^{vi}$—, $R^{vi}$ being an alkyl, aryl, aralkyl or cycloalkyl radical. Diols, polyols, diamines, and hydroxy amines are the preferred polyfunctional initiators, and these include ethylene and propylene glycol, diethylene and dipropylene glycol, 1,2-dibutylene glycol, glycerine, trimethylol propane, pentaerythritol, ethylenediamine, ethanolamine, and the like.

Any catalyst that will promote the polymerization of the alkylene oxide and lactone monomers can be used in the practice of this invention. Representative catalysts include alkali metal and alkaline earth hydroxide, and Lewis acids. Preferred catalysts are the alkali hydroxides, particularly potassium hydroxide (KOH).

The catalyst is used in catalytically significant amounts which is a function of many variables, including the nature and quantities of reactants, temperature, mixing, and the like. Catalyst concentrations of about 0.001 to about 2 weight percent are typical, with a concentration of about 0.01 to about 1 weight percent preferred.

The basic copolymers of this invention are made using conventional equipment and techniques. Typically, the lactone(s), e.g. ε-caprolactone, and the alkylene oxide(s), e.g. 1,2-butylene oxide, monomers are fed as a mixture (the relative amounts of each can vary as desired) to a reactor containing an organic initiator, e.g. either a mono- or polyfunctional initiator such as 2-ethylhexanol or glycerine if the copolymer is to be capped, or a polyfunctional initiator if the copolymer is to be left uncapped, in the presence of a catalytic amount of one or more alkali metal hydroxides, e.g. potassium hydroxide. The polymerization reaction is typically conducted at a temperature between about 75 and about 175° C., preferably between about 85 and about 150° C., and under anhydrous conditions. It can be performed on a batch, semicontinuous or continuous basis.

In one embodiment of this invention, the copolymer is capped with an alkylene oxide (which can be the same but is preferably different than the alkylene oxide(s) used to form the copolymer) to give a polymeric block cap. In this embodiment, the initiator used to form the copolymer can be either mono- or polyfunctional.

The polymeric block resulting from the capping step consists of a homopolymer if a single monomer is used, or a copolymer if more than one monomer is used. The amount of alkylene oxide used to cap the first block can vary widely. Illustrative copolymers capped with an alkylene oxide include (BO/lactone)-EO and (PO/lactone)EO copolymers having a hydrophobe of greater than 300 molecular weight with a final EO weight percentage of greater than zero to about 90. Preferred hydrophobe embodiments comprise a BO/lactone or PO/lactone of 750–2000 molecular weight with the weight percent of EO in the capped copolymer of between about 20 and 80. In some embodiments, the capping block can include polymerized monomer units other than an alkylene oxide, such as ϵ-caprolactone.

The temperature and other reaction conditions under which the capping reaction occurs is essentially the same as those used for the copolymerization reaction of the alkylene oxide and lactone. Typically, after the copolymerization reaction is completed, the capping alkylene oxide is fed to the same reactor in the same manner as the copolymer feed was fed. When completed, the alkali metal hydroxide catalyst is neutralized, and the capped polyoxyalkylene product recovered using conventional equipment and techniques. For copolymers of ϵ-caprolactone and 1,2-butylene oxide, the preferred capping alkylene oxide is ethylene oxide.

In another embodiment of this invention, the copolymer is left uncapped. In this embodiment, the copolymer is made with a polyfunctional initiator and an alkali metal catalyst.

The capped and uncapped polyoxyalkylene copolymers of this invention are useful, among other things, as nonionic surfactants and foam control agents. These block copolymers and random copolymers are used in the same manner as known surfactants and foam control agents, but they demonstrate an enhanced biodegradability as compared to polyoxyalkylene copolymers which do not contain a polymerized lactone group in their backbones, e.g. polyoxypropylene, polyoxybutylene, etc. Moreover, the capped polyoxyalkylene block copolymers of this invention have added design flexibility, relative to the uncapped copolymers, due to the combination of the capping block and the presence of polymerized lactone groups in the polymer backbone.

The following examples further illustrate this invention. Unless indicated to the contrary, all parts and percentages are by weight.

SPECIFIC EMBODIMENTS

EXPERIMENTAL

Materials

Both the ϵ-caprolactone (ϵ-CL) and n-dodecane used in these examples were purchased from Aldrich Chemical Company, Inc.

Procedure for Synthesizing BO/ϵ-CL-EO Copolymer Surfactant

Into a closed-system, two-gallon capacity steel reaction vessel was charged 200 g of 1,2-propylene glycol monobutyl ether and 4 g of solid KOH. The reactor was sealed and the temperature was increased to 130° C. at which time a mixture of 518 g of 1,2-butylene oxide and 519 g of ϵ-CL was fed at such a rate so as to maintain an internal pressure of less than 70 pounds per square inch absolute ("PSIA") (483 kPa absolute). Following the addition of all of the 1,2-butylene oxide/caprolactone mixture, the temperature of the reaction mixture was maintained at 130° C. until the pressure drop over a one-hour period was less than 0.5 PSIA.

After this digestion period was complete, the reactor contents were sampled and percent hydroxyl analysis performed to determine the average molecular weight of the surfactant hydrophobe product. The analysis showed the monol polymer to have a hydroxyl equivalent weight of 727 (corresponding to 727 number averaged molecular weight).

In order to provide material for hydroxyl analysis sampling, 396 g of the intermediate monol hydrophobe were removed. To the remaining 845 g of intermediate monol was fed 1080 g of ethylene oxide followed by a digestion period similar to above. Samples of the mixture totaling 424 g were taken and analysis showed the product to have a hydroxyl equivalent weight of 1453 (corresponding to 1453 number averaged molecular weight). The final liquid surfactant product (1501 g) was neutralized with 2.22 g of glacial acetic acid.

Procedure for Synthesizing PO/ϵ-CL Foam Control Agents

Into a closed-system, two-gallon capacity steel reaction vessel was charged 96 g of 1,2-propylene glycol and 4.75 g of solid KOH. The reactor was sealed and the temperature was increased to 120° C. at which time a mixture of 1375 g of propylene oxide and 1375 of ϵ-CL (50/50 w/w) was fed at such a rate to maintain an internal pressure of less than 70 PSIA (483 kPa absolute). Following all the addition of all of the propylene oxide/caprolactone mixture, the temperature of the reaction mixture was maintained at 120° C. until the pressure drop over a one-hour period was less than 0.5 PSIA.

After this digestion period was complete, the reactor contents were sampled and percent hydroxyl analysis performed to determine the average molecular weight of the product. Analysis showed the diol copolymer to have a hydroxyl equivalent weight of 942.5 (corresponding to 1885 number averaged molecular weight).

In order to provide material for hydroxyl analysis sampling, 245 g of the product diol were removed leaving 2606 g of product. The final liquid product was neutralized by hot filtration through a filter cake of magnesium silicate.

The above procedure was repeated to make 80/20 (w/w) PO/ϵ-CL foam control agent using the required amounts of PO and ϵ-CL.

Preferred Manner of Practicing the Invention (BO/Lactone)-EO copolymer surfactants having hydrophobes of greater than 300 $M_w$ and capped with EO to give final EO weight percentages of between zero and 90% are preferred. This is true for (PO/Lactone)-EO copolymers also. The most preferred hydrophobe embodiment comprises a BO/Lactone or PO/Lactone hydrophobe of 750–2000 Mw capped with EO giving a final percentage of EO in the polymer of between 20 and 80%.

The preferred molecular weight range of BO/Lactone or PO/Lactone polymers is greater than 300 Mw.

The preferred range of oxide to lactone ratio is between 99/1 and 1/99.

Examples of lactone-type monomers useful in this invention include epsilon-caprolactone, alkyl-substituted epsilon-caprolactones, delta-valerolactone, and gammabutyrolactone.

Percent Hydroxyl Analysis

Percent hydroxyl (OH) analysis for obtaining number-averaged molecular weights was performed using test method ASTM D4274-88, Method D, with the modification of endpoints detected by potentiometry.

Draves Wetting Time

The method used was ASTM D2281-68. The skeins were purchased from Testfabrics, Inc., and a three gram copper hook was used. Ross-Miles Foam Testing ASTM method D1173-53 was used. The temperature was maintained at 25° and 50° C. by means of a temperature control bath.

Cloud Point

Approximately 80 mL of a 1% (w/v) surfactant solution was added to a 100 mL beaker containing a magnetic stir bar. The solution was placed atop a heater/stirrer unit. A red alcohol thermometer bulb was immersed fully into the solution, and it was secured to a ring stand with a small clamp. The stirrer was started, and the heat control was gradually increased to give a solution temperature rise of approximately 2° C. per minute. Two observations were made: (1) the temperature at which the solution became (diblock monol) BO/ε-CL/EO copolymers. The same performance data on commercial BO/EO materials of similar molecular weight (Examples C-1 and C-2) is also reported in Table 1 for comparison purposes.

TABLE 1

| | Wetting, Foaming, and Cloud Point Properties | | | | | | | |
|---|---|---|---|---|---|---|---|---|
| | Draves Wetting Time (sec) | | | Ross-Miles Foam Height (mm), 0.5 min. | | | | Cloud Point, (Deg. C.), Aqu. |
| Surfactant | 0.1% | 0.5% | 1.0% | 0.1%, 25 C | 1.0%, 25 C | 0.1%, 50 C | 1.0%, 50 C | 1.0% (w/w) Initial, Final |
| Ex. 1 | >360 | 23.5 | 5.5 | 37, 12 | 56, 9 | 11, 0 | 52, 0 | 45, 46 |
| Ex. C-1 | >360 | 14.8 | 0 | 71, 21 | 170, 18 | 81, 11 | 171, 10 | 79, 81 |
| Ex. 2 | 143 | 14.4 | 3.7 | 25, 17 | 23, 13 | 10, 0 | 18, 7 | 17, 22 |
| Ex. C-2 | 41 | 7.8 | 4.5 | 91, 33 | 169, 33 | 92, 15 | 158, 22 | 63, 99 | turbid to the naked eye, and (2) the temperature at which the turbidity completely obscured the red thermometer bulb from view. Cloud points reported as being below or near 25° C. were run by first cooling the solution to about 5° C. and allowing the solution to warm slowly.

Surface Tension and CMC Measurements

A Krüss model K-12 computer-automated tensionmeter (Krüss USA) was used to measure all surface and interfacial tensions. Interfacial tensions were run under dodecane. Accessories included a Lauda RM-6 constant temperature circulating bath which held the temperature at 25±0.1° C. A Metrohm model 665 dosimat automated pipette dispenser was used to dose precise increments of the appropriate surfactant stock solution into the measuring vessel for CMC (Critical Micelle Concentration) work. A logarithmic dosing method was used. Interfaces were not aged to any given degree other than the time needed for the instrument to make the measurements.

Biodegradability Testing

The standard EPA protocol (Standard methods for the Examination of Water and Waste Water, 15th Ed., American Public Health Association, American Water Works Association, and Water Pollution Control Federation, 1980.) was used for the closed bottle biological oxygen demand (BOD) test with the measured oxygen uptake done using an oxygen-selective electrode. BOD is defined as the weight of oxygen taken up per unit weight of test material. Bacterial seed was obtained from both industrial and municipal sources.

RESULTS AND DISCUSSION

Polymer Synthesis and Surfactant Structural Features

Figure 1:
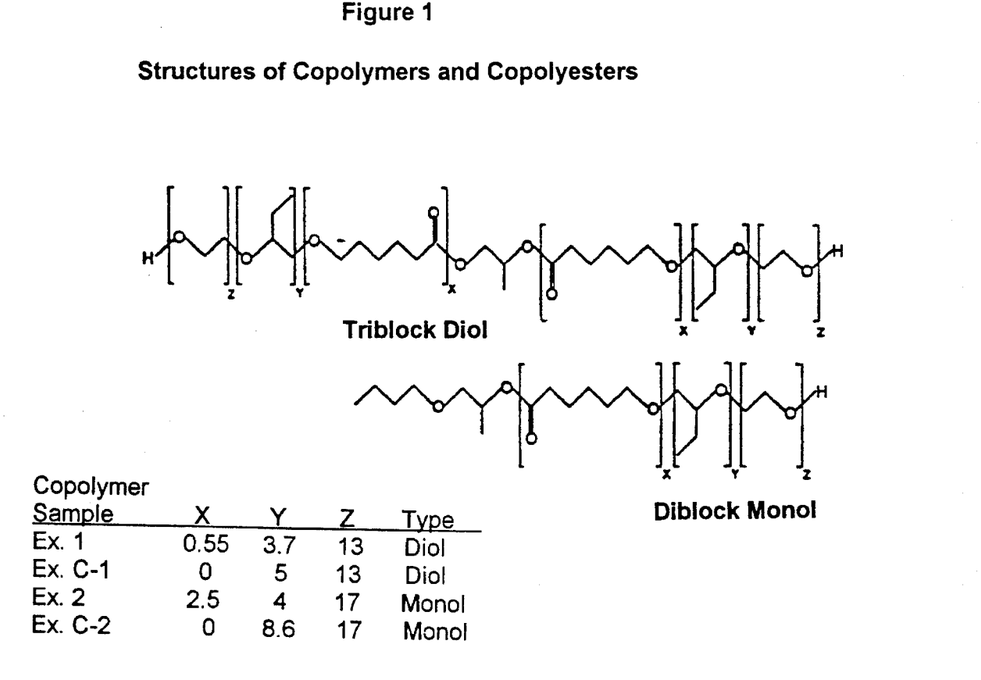
FIG. 1 shows generalized structures for two butylene oxide/ε-caprolactone/ethylene oxide copolymers (i.e. also commonly called copolyesters), and two commercial butylene oxide/ethylene oxide copolymers (Polyglycol B40-1900 and BL50-1500 both manufactured by the Dow Chemical Company).

FIG. 1 shows generalized structures for two BO/ε-CL/EO copolymers and two BO/EO commercial products. Example 1 is a diol triblock copolymer made by using a nominal 250 number average molecular weight ($M_n$) polybutylene glycol initiator, and feeding a mixture of 25% by weight of ε-CL in BO to yield a diol with a $M_n$ of 730 (17 wt % ε-CL in finished intermediate). This intermediate was then reacted with EO giving a triblock surfactant of 1878 $M_n$p The second material (Example 2) made was initiated with DOWANOL® PnB glycol ether (propylene glycol mono-n-butyl ether manufactured by The Dow Chemical Company) and fed with a 50/50 (w/w) ratio of BO/ε-CL to 727 $M_n$, and then EO-capped to 1453 $M_n$.

Wetting, Foaming and Cloud Point Properties

Table 1 reports the wetting, foaming, and cloud point properties for the Example 1 (triblock diol) and Example 2

Although the wetting performance for the Example 1 copolyester (i.e. the reaction product of the alkylen oxide, lactone and initiator) is slightly lower (longer wetting times) than that for the Control Example 1 block copolymer, both are very acceptable from a commercial perspective. This longer wetting time is likely due to the increased hydrophilic property of the ε-caprolactone-derived block. The weight percentage of oxygen in ε-CL (28.1%) is very similar to that of propylene oxide (27.6%), but BO has 22.2 percent oxygen and correspondingly lower polarity. This same trend is also seen with the surfactant pair of Examples 2 and C-2.

Ross-Miles foaming for the copolyester test polymers is considerably less than the commercial BO/EO copolymers. This allows for the synthesis of a broad range of copolymer structures having either enhanced or diminished foaming properties, with either being commercially useful, depending upon the application.

The cloud point is also affected by incorporating ε-CL into the BO hydrophobe. Replacing 17% of the BO in the surfactant of Ex. C-1 with ε-CL lowers the cloud point by 35 degrees. Replacing 50% of the BO in the surfactant of Ex. C-2 decreases the cloud point to below room temperature. Incorporating ε-CL into the hydrophobe of the block copolymer provides a means by which the water solubility of the copolymer can be designed to fit specific commercial needs.

Surface Tension and Other Interfacial

Tables 2 A and B report the results of several measurements done on the Example 1 BO/ε-CL/EO copolyester. Also reported are the corresponding data obtained from the commercial triblock of Ex. C-1. Table 2-A reports that the surface and interfacial tension values at 0.1 and 1.0 wt % are slightly higher for the BO/ε-CL/EO copolyester, indicating a lower degree of surface activity due to the higher-polarity ester functionality. The critical micelle concentrations for each surfactant are not significantly different. As a result of this, the free energy of micellization for each is comparable.

TABLE 2-A

Interfacial Properties of ξ-CL/BO/EO Copolyester and a Commercial Triblock

| Surfactant | Surface tension (dynes/cm) 0.1% | 1.0% | Interfacial Tension (dynes/cm) 0.1% | 1.0% | CMC (Molar) | CMC (mg/L) |
|---|---|---|---|---|---|---|
| Ex. 1 | 34.4 | 33.7 | 3.7 | 2.8 | 2.03 E-4 | 382 |
| Ex. C-1 | 32.3 | 32.4 | 3.3 | 2.1 | 2.10 E-4 | 381 |

TABLE 2B

Surface Excess and Area Per Molecule Values of ξ-CL/BO/EO Copolyester Compared to a Commercial Triblock

| | Surface Excess (moles/ cm$^2$) | Area Per Molecule (Ang$^2$) | Delta G. Mic. (J/mole) | $C_{20}$ (Molar) | Pi CMC (dynes/cm) |
|---|---|---|---|---|---|
| Ex. 1 | 1.45 E-10 | 115 | −30,993 | 1.47 E-6 | 38 |
| Ex. C-1 | 1.62 E-10 | 103 | −30,916 | 1.28 E-6 | 40 |

The surface excess concentration and area per molecule values in Table 2B indicate that the copolyester surfactant molecules take up slightly more room at the interface.

Referring again to Table 2B, the $C_{20}$ value of the copolyester is higher than that of the BO/EO copolymer indicating a higher concentration at which interfacial saturation occurs. This value gives the minimum concentration of surfactant necessary to give a 20 dynes/cm surface tension reduction.

The effectiveness of a surfactant is defined as the maximum decrease in surface tension that can be obtained at the CMC. This is more aptly described as the maximum surface pressure, or $Pi_{CMC}$. This value typically trends with surfactant efficiency ($C_{20}$). As seen in Table 2, the copolyester has a 2 dynes/cm lower value of $Pi_{CMC}$.

Biodegradability Testing of the Ex. 2 BO/ε-CL/EO Monol

Figure 2:
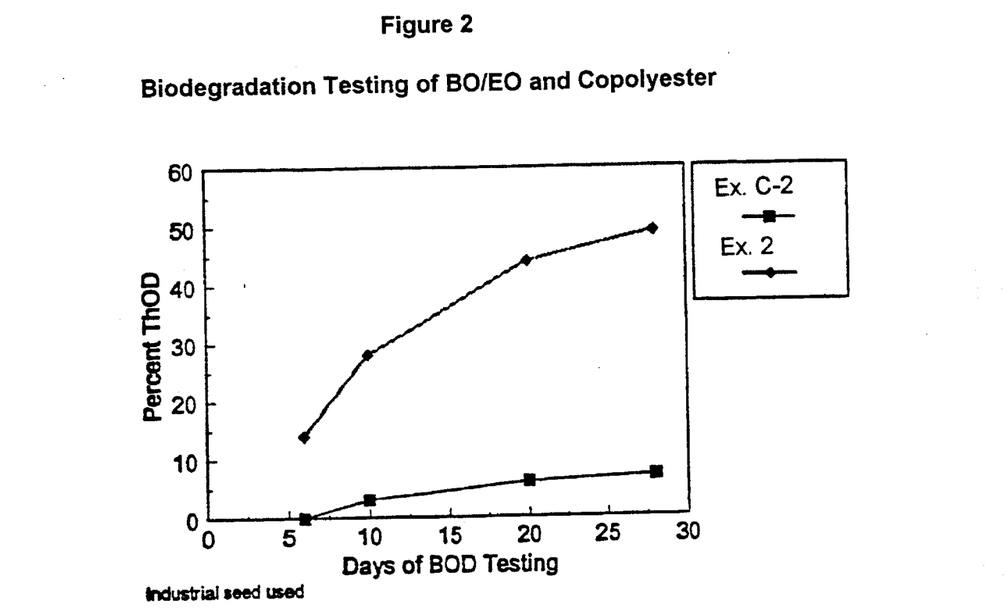
FIG. 2 is a graph of a biodegradation test of a surfactant of this invention and a commercially available surfactant (Polyglycol BL50-1500).

Closed-bottle BOD tests were performed using bacterial seed from an industrial source. The surfactants of Ex. 2 and C-2 were studied. Dissolved oxygen was measured on replicate samples at 6, 10, 20, and 28 days. These values were used to calculate percent degradation based on the theoretical value of oxygen that would be consumed if all of the surfactant substrate were to react to give carbon dioxide and water. Table 3 reports the percentages of degradation at the specified time periods. FIG. 2 shows the data in graphical fashion. After 28 days 49% of the copolyester was consumed as compared to only 7% of the BO/EO diblock monol control.

TABLE 3

Biodegradation Data from BOD Analysis

| Compound | Theoretical Oxygen Demand (mg/L)* | Percent of Surfactant Degraded 6♦ | 10♦ | 20♦ | 28♦ |
|---|---|---|---|---|---|
| Ex. C-2 | 320 | 2 | 3 | 6 | 7 |
| Ex. 2 | 309 | 14 | 28 | 44 | 49 |

TABLE 3-continued

Biodegradation Data from BOD Analysis

| Compound | Theoretical Oxygen Demand (mg/L)* | Percent of Surfactant Degraded 6♦ | 10♦ | 20♦ | 28♦ |
|---|---|---|---|---|---|

*Based on 150 mg/L surfactant concentration
♦Days

Blender Foam Control Test

The foam control properties of the PO/ε-CL random copolymer diols described above, each having a $M_n$ of approximately 1900 with 20/80 and 50/50 (w/w) ε-CL/PO ratios, were tested using ASTM standard blender test D3519-88. The control foam control agent (FCA) was polypropylene glycol P-2000. The results are reported in FIGS. 3 and 4.

Figure 3:
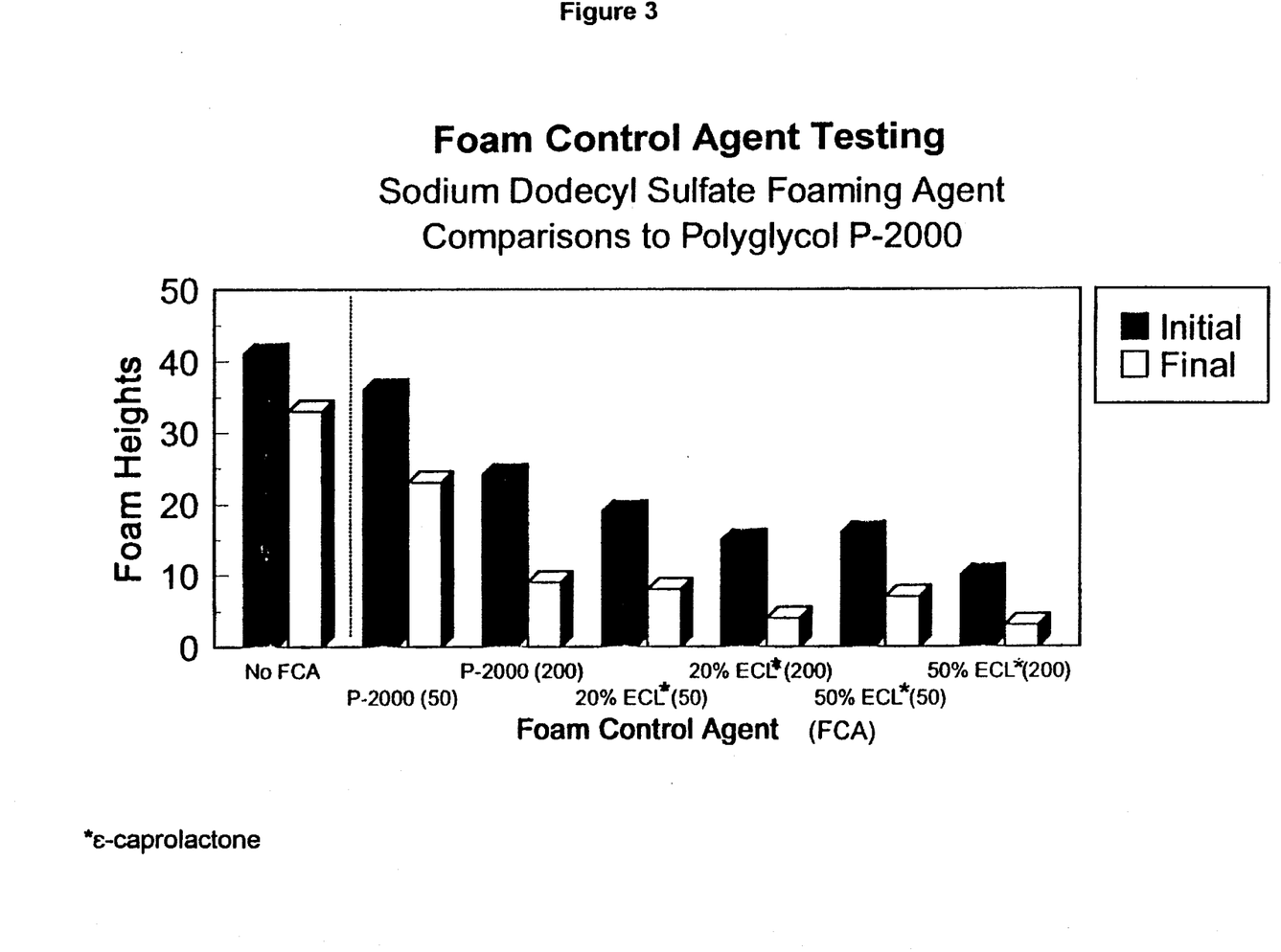
FIG. 3 is a bar graph reporting the results of an ASTM D3519-88 blender foam control test using 0.01% sodium dodecyl sulfate as the foaming agent.
Figure 4:
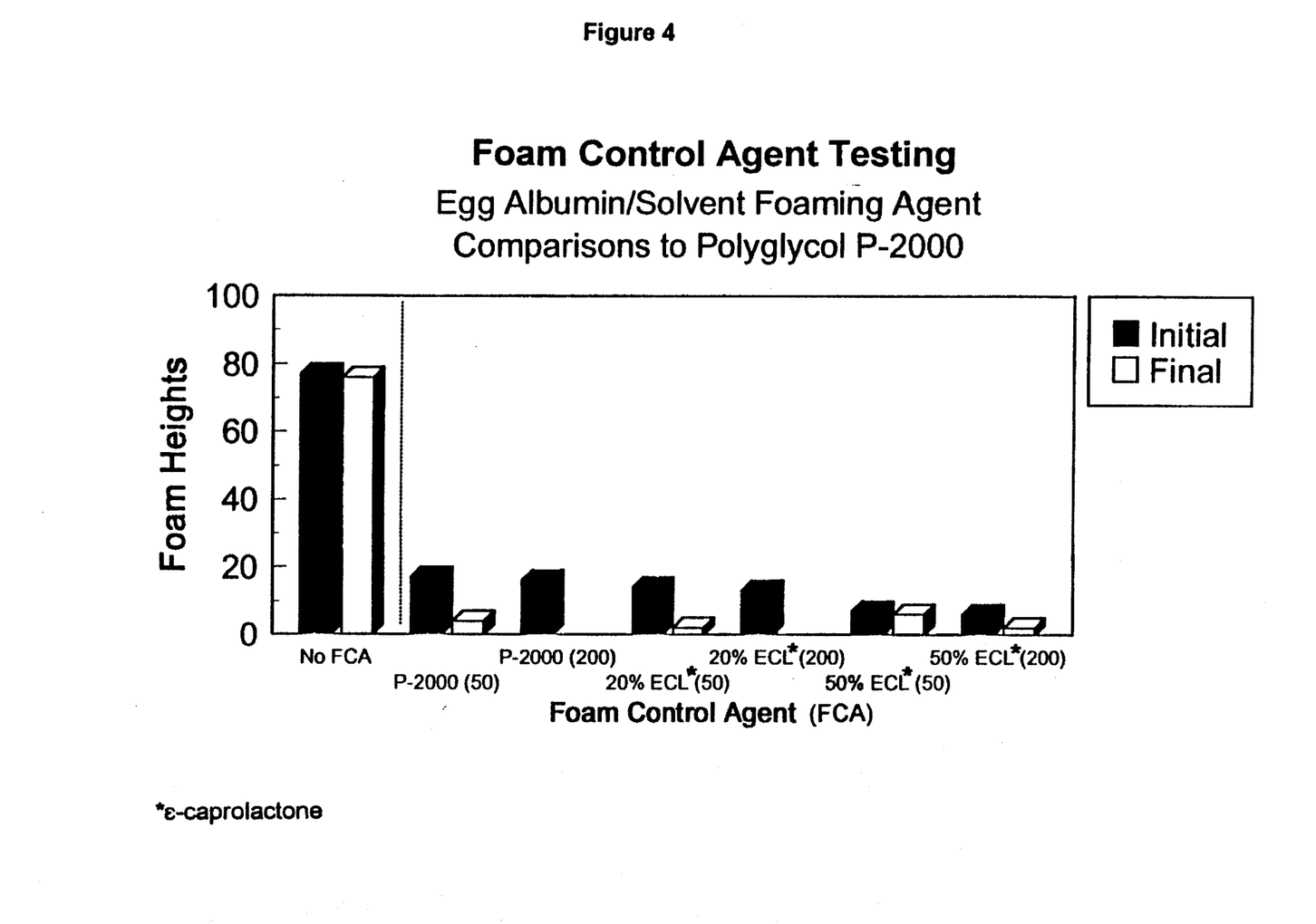
FIG. 4 is a bar graph reporting the results of an ASTM D3519-88 blender test using a mixture of 0.2% egg albumin and DOWANOL® PM glycol ether as the foaming agent.

Reported are initial (t=0) and final (t=5 min) foam heights for propylene glycol P-2000 and both PO/ε-CL FCAs at concentrations of 50 and 200 ppm. Also reported are the foam heights of a foaming system without a FCA. In each system, at both concentrations, PO/ε-CL copolymers controlled foam more efficiently in terms of either initial foam, final foam, or both compared to the polypropylene glycol control.

Biodegrability Testing of the 20/80 (w/w) ε-CL/PO FCA

Figure 5:
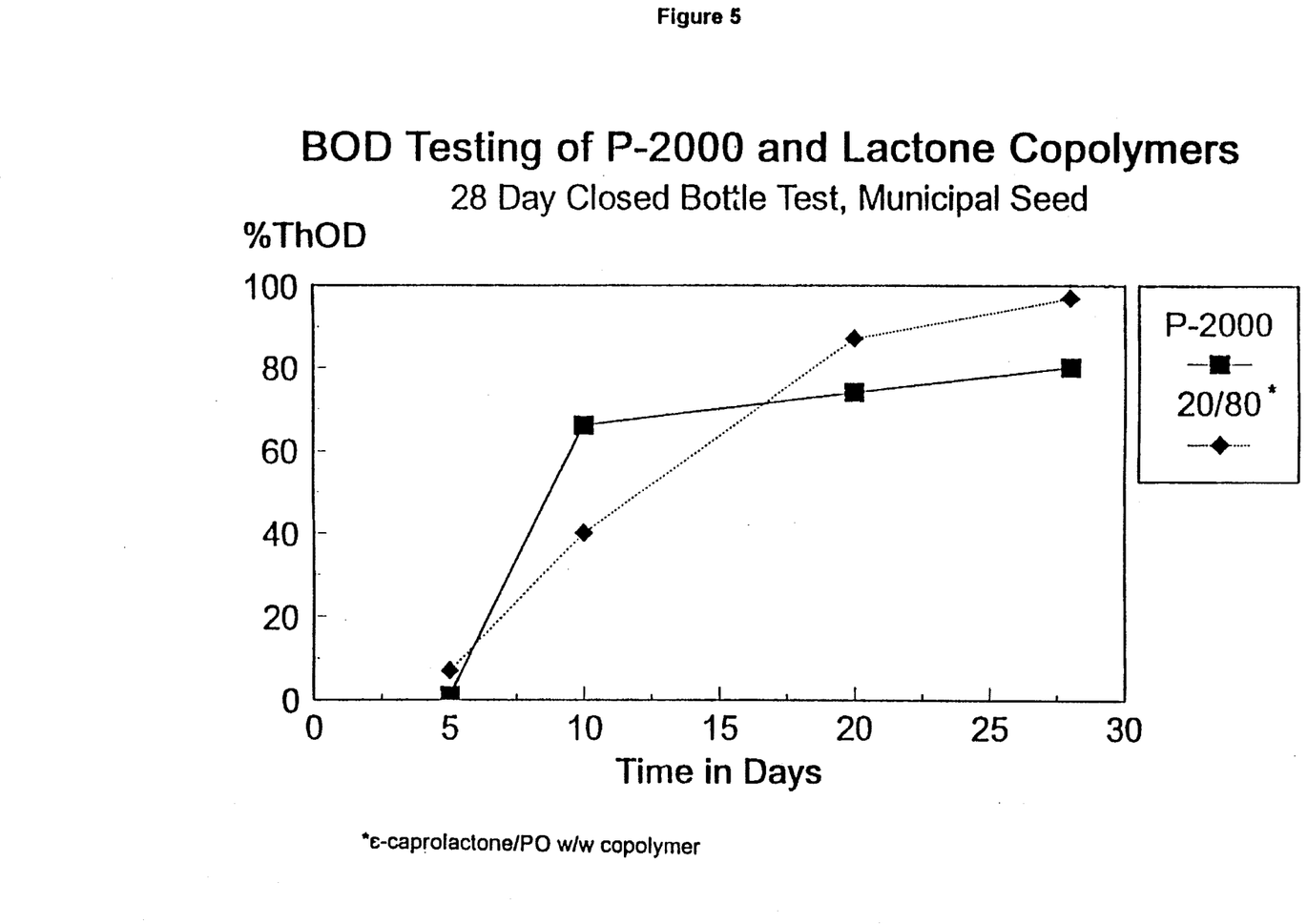
FIG. 5 is a graph reporting BOD testing of a control and a foam control agent of this invention using bacterial seed from a municipal source.
Figure 6:
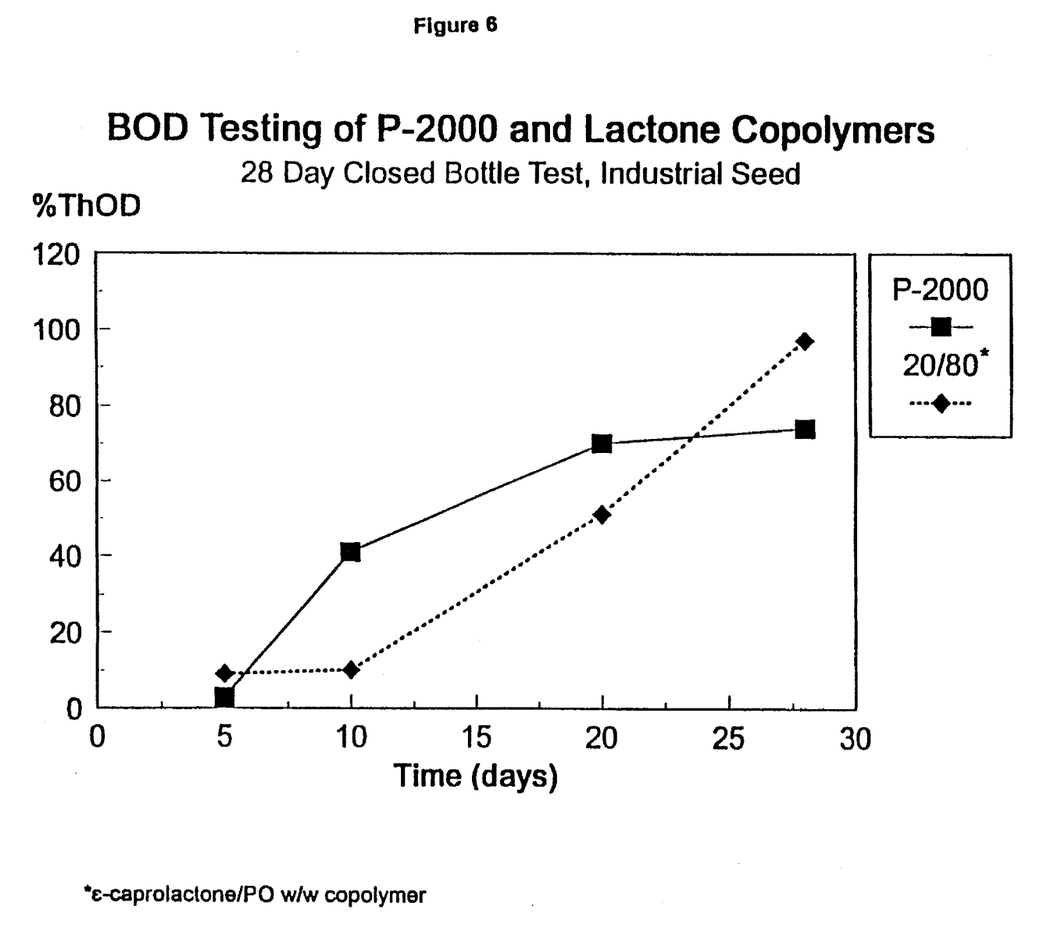
FIG. 6 is a graph reporting BOD testing of a control and a foam control agent of this invention using bacterial seed from an industrial source.

Using the BOD test described above, FIGS. 5 and 6 report the results for the 20/80 (w/w) ε-CL/PO FCA and the P-2000 control. FIG. 5 reports the results using a municipal seed, and FIG. 6 reports the results from using an industrial seed. After 28 days, over 95% of the ε-CL/PO FCA was degraded in each case.

Biodegradeable Lubricants

Lubrication performance was measured using SRV (oscillation, friction and wear) test equipment to determine friction coefficient and load bearing capacity of various ε-CL copolymers. The results are summarized in Table 4.

TABLE 4

Lubrication Data for ξ-CL Copolymers

| Lubricant (w/w) | Friction Coefficient Average (30 C, 200 N) | Extreme Pressure Fail Load at 30 C (N) |
|---|---|---|
| Control* | 0.13 | 450 |
| 80/20 PO/ξ-CL | 0.13 | 350 |
| 50/50 PO/ξ-CL | 0.11 | 550 |
| 83/17 BO/ξ-CL | 0.13 | 350 |

*SYNALOX 50/50B polyglycol (a polyglycol lubricant manufactured and sold by The Dow Chemical Company)

The biodegradeable alkylene oxide/ε-CL polymers compared favorably with the polyglycol control.

Although the invention has been described in considerable detail, such detail is for the purpose of illustration only and many variations and modifications can be made by one skilled in the art without departing from the spirit and scope of the invention as described in the following claims.

What is claimed is:

1. A biodegradable, capped alkylene oxide-lactone copolymer, the copolymer comprising polymerized:
   A. Alkylene oxide units derived from an alkylene oxide of the formula (I)

in which each R, individually, is hydrogen, a $C_1$–$C_6$ alkyl or alkoxy radical, or in which the two R substituents together with both vicinal epoxy carbons form a saturated or monoethylenically unsaturated cycloaliphatic hydrocarbon ring; and B. Lactone units derived from a lactone of the formula

(II)

in which n is at least two and each R' is independently hydrogen, $C_1$–$C_4$ alkyl, cyclohexyl, $C_1$–$C_4$ alkoxy or a single ring aromatic hydrocarbon radical; with the proviso that at least four R' are hydrogen; and the cap comprising a polymer block of polymerized alkylene oxide units derived from an alkylene oxide of Formula I in (A) above.

2. The copolymer of claim 1 in which the alkylene oxide of Formula I is selected from the group consisting of ethylene oxide, propylene oxide and the butylene oxides.

3. The copolymer of claim 2 in which the lactone of Formula II is an ε-caprolactone.

4. The copolymer of claim 3 in which the ε-caprolactone is of the formula (III)

in which each are R", independently, is hydrogen or a $C_1$–$C_4$ alkyl or alkoxy radical, with the proviso that no more than three R" substituents are groups other than hydrogen.

5. The copolymer of claim 4 in which the ε-caprolactone is an unsubstituted ε-caprolactone.

6. The copolymer of claim 5 in which the polymer block of polymerized alkylene oxide units in (C) is derived from ethylene oxide.

7. A biodegradable alkylene oxide-lactone copolymer prepared by contacting under copolymerization conditions:

A. At least one alkylene oxide of the formula (I)

in which each R, individually, is hydrogen, a $C_1$–$C_6$ alkyl or alkoxy radical, or in which the two R substituents together with both vicinal epoxy carbons form a saturated or monoethylenically unsaturated cycloaliphatic hydrocarbon ring; and B. At least one lactone of the formula in which n is at least two and each R' is independently hydrogen, $C_1$–$C_4$ alkyl, cyclohexyl, $C_1$–$C_4$ alkoxy or a single ring aromatic hydrocarbon (II)

radical; with the proviso that at least four R' are hydrogen;

C. A polyfunctional initiator of the formula $R^v(YH)_z$ (V)

in which $R^v$ is an aliphatic, cycloaliphatic, aromatic or heterocyclic radical; z is at least two; and each Y is independently —O—, —S—, —NH— or —$NR^{vi}$—, $R^{vi}$ being an alkyl, aryl, aralkyl or cycloalkyl radical; and D. A catalyst selected from the group consisting of alkali metal hydroxide, alkaline earth hydroxides and Lewis acids, in an amount that will promote the copolymerization of the alkylene oxide and the lactone.

8. The copolymer of claim 7 in which the alkylene oxide of Formula I is selected from the group consisting of ethylene oxide, propylene oxide, and the butylene oxides.

9. The copolymer of claim 8 in which the lactone of Formula II is an ε-caprolactone.

10. The copolymer of claim 9 in which the lactone is of the formula (III)

in which each are R", independently, is hydrogen or a $C_1$–$C_4$ alkyl or alkoxy radical, with the proviso that no more than three R" substituents are groups other than hydrogen.

11. The copolymer of claim 10 in which the lactone is an unsubstituted ε-caprolactone.

12. The copolymer of claim 11 in which the polyfunctional initiator is selected from the group consisting of ethylene glycol, propylene glycol, diethylene glycol, dipropylene glycol, 1,2-dibutylene glycol, glycerine, trimethylol propane, pentaerythritol, ethylendiamine, and ethanolamine.

13. The colpolymer of claim 12 in which the catalyst is selected from the group consisting of alkali metal and alkaline metal earth methal hydroxides.

14. The colpolymer of claim 13 in which the catalyst is potassium hydroxide.

15. A surfactant comprising the copolymerof claim 1.

16. A surfactant comprising a copolymer of claim 7.

17. A foam control agent comprising the copolymer of claim 1.

18. A foam control agent comprising the copolymer of claim 7.

19. A lubricant comprising the copolymer of claim 1.

20. A lubricant comprising the copolymer of claim 7.

* * * * *

UNITED STATES PATENT AND TRADEMARK OFFICE
CERTIFICATE OF CORRECTION

PATENT NO. : 5,525,702

DATED : June 11, 1996

INVENTOR(S) : Vaughn M. Nace

It is certified that error appears in the above-identified patent and that said Letters Patent is hereby corrected as shown below:

Under Other Publications, first reference publication listed, "Polycaprolatione" should read -- Polycaprolactone --.

Under Other Publications, second column, sixth reference publication listed, "ε-Caprolaxtone" should read -- ε-Caprolactone --.

Second Page of Other Publications, second column, tenth reference publication listed, "ε-Caprolaxtone" should read -- ε-Caprolactone --.

Col. 5, line 1, "(PO/lactone)EO" should read -- (PO/lactone)-EO --.

Col. 6, line 50, "gammabutyrolac-" should read -- gamma-butyrolac- --.

Col. 6, line 60, "Ross-Miles Foam Testing" should be by itself on a seperate line.

Col. 7, line 59, "$M_nP$" should read -- $M_n$. --.

Col. 8, line 23, "alkylen oxide" should be -- alkylene oxide --.

Col. 8, line 54, add -- Properties. -- after "Interfacial".

Col. 9, line 3, in Table 2-A, "ξ-CL/BO/EO" should read -- ε-CL/BO/EO --.

Col. 9, line 17, in Table 2B, "ξ-CL/BO/EO" should read -- ε-CL/BO/EO --.

Col. 10, line 22, "propylene" should read -- polypropylene --.

Col. 10, line 45, line 50-52, in Table 4, "ξ-CL" should read -- ε-CL --. (4 instances)

UNITED STATES PATENT AND TRADEMARK OFFICE
CERTIFICATE OF CORRECTION

PATENT NO. : 5,525,702

DATED : June 11, 1996

INVENTOR(S) : Vaughn M. Nace

It is certified that error appears in the above-identified patent and that said Letters Patent is hereby corrected as shown below:

Col. 11, line 21, a new paragraph should begin after "hydrogen; and".

Col. 11, line 47, insert -- cap comprising the -- between "the" and "polymer block".

Col. 11, line 48, delete "in (C)".

Formula (II) in Col. 12 should be inserted after "lactone of the formula" in Col. 11, line 63. Col. 11, line 63, "In which n..." should start a paragraph after Formula (II) in Col. 12.

Col. 12, line 13, "(V)" should read -- (IV) --.

Col. 12, line 52, delete "metal" after "alkaline".

Col. 12, line 52, "methal" should be -- metal --.

Col. 12, line 55, "copolymerof" should read -- copolymer of --.

Signed and Sealed this

Eighth Day of October, 1996

Attest:

BRUCE LEHMAN

*Attesting Officer*   *Commissioner of Patents and Trademarks*